Aug. 15, 1939.  E. F. MARTINET  2,169,323
FOOD PREPARER
Filed Oct. 14, 1936   2 Sheets-Sheet 1

Inventor
Eugene F. Martinet
By
Attorneys

Aug. 15, 1939.  E. F. MARTINET  2,169,323
FOOD PREPARER
Filed Oct. 14, 1936  2 Sheets-Sheet 2
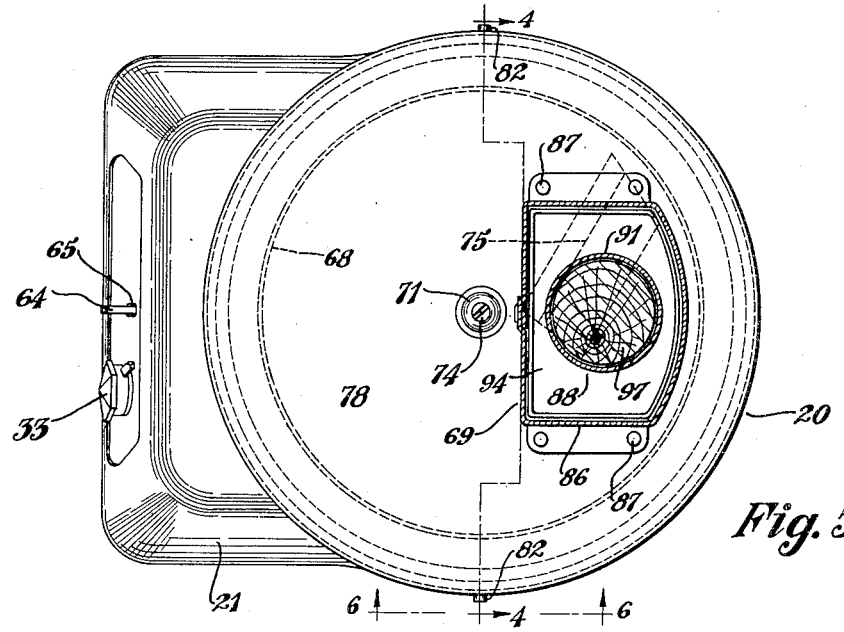
Fig. 3
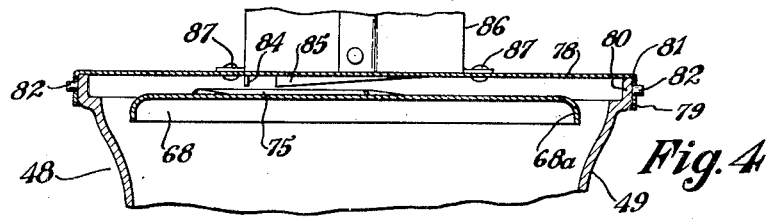
Fig. 4
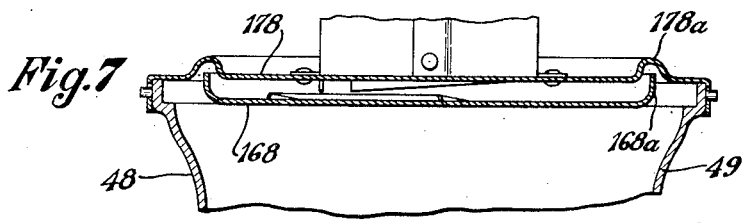
Fig. 7
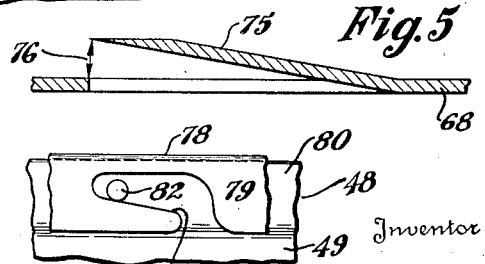
Fig. 5
Fig. 6
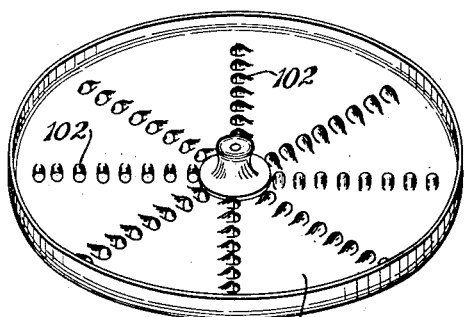
Fig. 8
Inventor
Eugene F. Martinet
By Frease and Bishop
Attorneys Patented Aug. 15, 1939

2,169,323

UNITED STATES PATENT OFFICE 2,169,323

FOOD PREPARER

Eugene F. Martinet, Cleveland, Ohio, assignor to The P. A. Geier Company, Cleveland, Ohio, a corporation of Ohio Application October 14, 1936, Serial No. 105,568

3 Claims. (Cl. 146—125)

The invention relates to food preparing devices, or appliances for slicing and shredding foods and foodstuffs, and more particularly to a food slicing and shredding device of a type having the operating mechanism housed in a base, a food receiving bowl mounted on the base, and the food slicing and shredding elements detachably mounted above the bowl and detachably connected with the operating mechanism through a central tubular sleeve with which the bowl is provided, and this application is a continuation-in-part of my copending application Serial No. 692,483, entitled Food preparers, filed October 6, 1933, now matured into a Patent No. 2,063,692.

Prior food preparers of this type have either been limited in use for one purpose only, or have given rise to difficulties so numerous as to render them impractical.

It is therefore an object of the present invention to provide an improved food slicing and shredding device which overcomes the difficulties encountered with prior devices of this type, in which the food slicing and shredding elements are mounted for quick operative attachment or detachment above the bowl in the same manner as numerous other food preparing elements, without the use of bolts, screws, or other special fastening and mounting means such as adapters, supports, connectors, reduction gears and the like.

Another object is to provide an improved food slicing and shredding device in which all the oil and grease for lubricating the driving mechanism thereof is at all times kept below the food receiving bowl, so as to render it imposible for oil or grease to drop into or become mixed with food therein.

A further object is to provide an improved food slicing and shredding device which has a very low center of gravity located either within or below the food receiving bowl thereof, so that the device is not top heavy and will not tip over during use.

A still further object is to provide an improved food slicing and shredding device which is rigid, compact and simplified in construction and in which a multiple speed motor is utilized for driving various slicing and shredding elements at proper speeds, which motor is adapted for driving other food processing elements at proper speed for carrying out their respective operations.

It is likewise an object of the present invention to provide an improved food slicing and shredding device in which the slicing and shredding elements may be readily removed or detached from the remaining parts of the device for being washed and kept in a sanitary condition, and subsequently replaced without the use of bolts, screws and the like, or the special operation of catches, locks and the like.

Similarly, it is an object of the present invention to provide an improved food slicing and shredding device in which there are no cavities, crevices, pockets and the like, other than in the slicing and shredding elements themselves, where food may enter or collect, by accidental spilling of food or food ingredients, which would render the device unsanitary, or which would affect the operation of the driving or driven parts or mechanism thereof.

And finally, it is an object of the present invention to provide an improved food slicing and shredding device in which safety devices are incorporated so that the operator cannot become accidentally or otherwise injured in operating the various slicing and shredding elements.

These and other objects may be attained by the parts, elements, apparatus, devices, arrangements and combinations, preferred embodiments of which are shown in the drawings and are hereinafter described in detail and claimed, which may be stated in general terms as including a food slicing and shredding device having a base housing provided with a sleeve projecting upwardly from and through the base, a multiple speed motor mounted within the base housing and operatively connected to a drive shaft journaled in said sleeve, a food receiving bowl having a central tubular sleeve journaled on said housing sleeve, and food slicing or shredding elements detachably mounted on the upper end of said housing sleeve and having a detachable clutch engagement with said drive shaft.

Referring to the drawings forming part hereof:

Fig. 3 is a plan view of the parts shown in Fig. 1, with certain parts thereof in section, as on the line 3—3, Fig. 1;

Fig. 4 is a fragmentary elevation section of certain of the parts shown in Figs. 1 and 3, taken on line 4—4, Fig. 3;

Fig. 5 is an enlarged fragmentary sectional view through the knife blade of the sliding plate shown in Figs. 1, 3 and 4;

Fig. 6 is a fragmentary side elevation showing the releasable connection between the food receiving bowl and safety hopper plate, looking in the direction of the arrows 6—6, Fig. 3;

Fig. 7 is a view similar to Fig. 4, showing a slightly modified form of slicing plate and safety hopper plate; and Fig. 8 is a perspective view of a shredding plate.

Similar numerals refer to similar parts throughout the various figures of the drawings.

Figure 2:
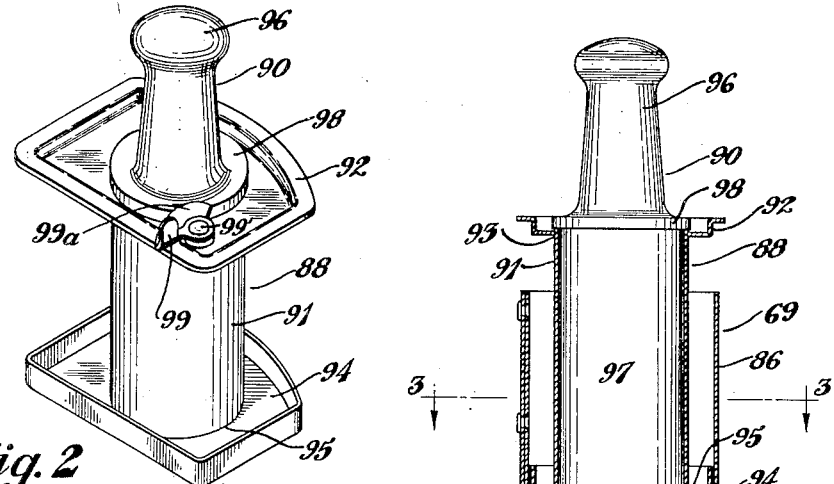
Fig. 2 is a perspective view of the pusher and feeder shown in Fig. 1.

The improved food slicing and shredding device is indicated generally at 20 and includes a base 21, preferably provided with rubber feet 22 for supporting the improved device upon a table or other convenient place of use. A housing indicated generally at 23 is connected to the base by screws 24, and the housing 23 preferably comprises an integral casting, which includes the gear case portion 25, the motor housing portion 26 and the sleeve member 27. The member 27 projects vertically upward from the gear case portion 25 through an aperture 28 in the base 21.

The motor housing portion 26 has a motor end cap 29 attached thereto, and a multiple speed motor is mounted within the motor housing and cap 26, 29, the motor shaft 30 thereof being provided with worm threads 31.

The food slicing and shredding device 20 is provided with suitable wiring 32 having a usual plug (not shown) for being attached to any suitable source of electric power; and the wiring 32 may lead to a control switch, the operating member 33 of which is shown in Fig. 3, from which suitable wires 34 may lead to the motor within the motor housing 26, 29. The motor and switch constructions are of a usual type and therefore are not illustrated in detail.

Oilless bearings 35 and 36 are mounted within and adjacent to the extremities of the sleeve 27, and a worm gear shaft 37 is journaled in said bearings 35 and 36, the upper end 37a of shaft 37 projecting upward beyond the upper end of sleeve 27, and the lower end 37b of said shaft projecting into the gear case portion 25 of the integral housing 23. A preferably linen micarta worm gear 38 meshes with the worm 31 and is provided with a hub 39 and mounted by a pin 40 on the lower end 37b of the worm gear shaft 37.

The lower end 37b of the shaft 37 is also provided with an axial recess 41 in which is located a ball bearing 42 that is held in position by peening over the edge of the recess after the ball has been inserted therein. An adjusting screw 43, located directly below the ball 42 and axially of the shaft 37, is provided with a lock nut 44 and is threaded through the removable gear case cover 45; and the screw 43 provides means for receiving the downward axial thrust of the shaft 37 and for adjustably locating the shaft 37 in proper position.

The gear case 25 may be filled with grease, and since the bearings 35 and 36 are oilless bearings, grease and lubricant for the motivating parts of the improved food slicing and shredding device are located below the top of and within the base 21.

By providing the integral housing 23, which includes in one piece the gear case 25, the motor case 26 and the sleeve 27, the parts thus far described may be readily machined and assembled in their proper and correct relation without play between parts; and great rigidity is imparted to the motivating parts of the device. Moreover, the bearings 35 and 36 in both being rigidly mounted in the sleeve 27, may be readily located in axial alignment so that the shaft 37 driven by the motor will always run true on center.

The upper end 37a of the shaft 37 is also provided with an axial recess 46 in which is located a ball bearing 47 that is held in position by peening over the edge of the recess 46 after inserting the ball therein, for a purpose which will hereinafter be described.

Figure 1:
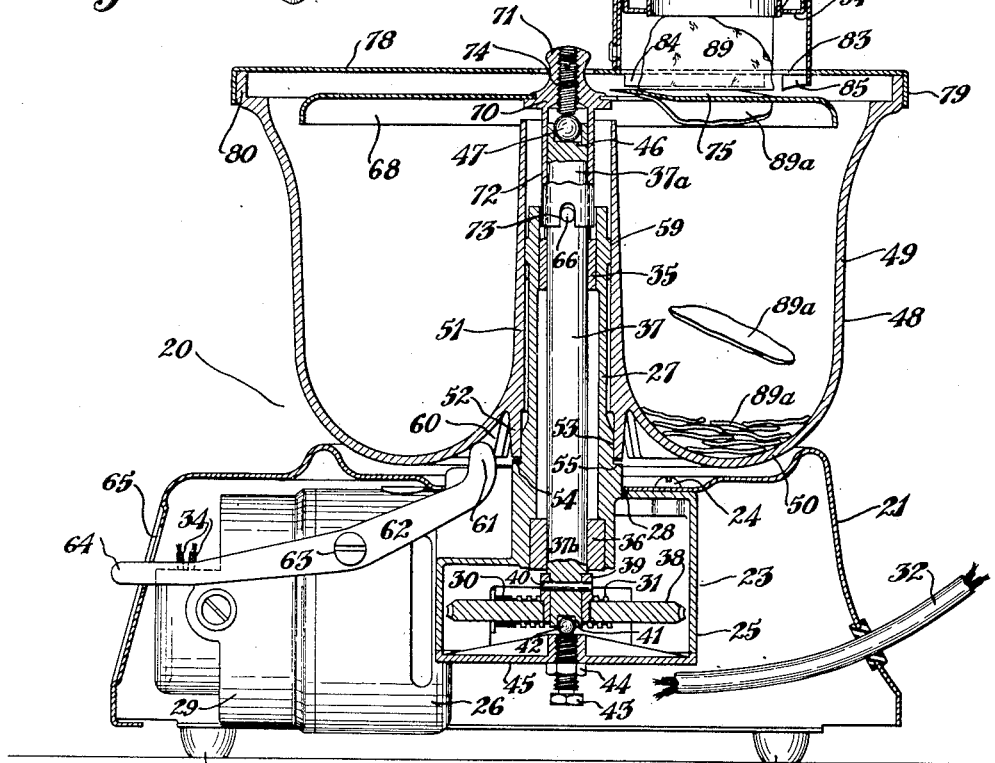
Figure 1 is a vertical sectional view of the improved slicing and shredding device in operative position.

A food receiving bowl 48 having an outer annular wall 49 which merges into the curved bottom wall 50 terminating inwardly and upwardly in a vertically extending central tubular sleeve 51, is telescoped over the sleeve 27, as best shown in Fig. 1, and the central bowl sleeve 51 projects above the upper end of the base housing sleeve 27 and is substantially coextensive with the upper end 37a of shaft 37.

The bowl 48 is also provided with a downwardly extending collar 52, which is substantially in continuation of its central sleeve, and the collar 52 is journaled about the external circumferential bearing portion 53 of the sleeve 27, while the lower end of the collar 52 preferably bears on a split anti-friction thrust ring 54 interposed between the collar 52 and the annular step or shoulder 55 of the sleeve 27.

The sleeve 27 is also provided with an external annular upper bearing surface 59 spaced from the bearing portion 53 and above the base 21, and journaled in the bowl sleeve 51, which is telescoped thereover and removably rotatably mounted thereon.

The food receiving bowl 48 is preferably provided with a series of radial ribs or ears 60 extending inward from the curved bottom wall 50 toward the collar 52 for selective engagement with the inner end 61 of the bowl locking lever 62, which is pivoted at 63 to the motor housing 26, the outer operating end 64 of the lever projecting outward through a slot 65 in the base 21, as best shown in Figs. 1 and 3. With the lever in the position shown in Figs. 1 and 3, the bowl 48 is held against rotation.

The upper end portion 37a of the shaft 37 preferably has a diametrically disposed driving pin 66 for providing driving connection means adapted to be engaged by the improved slicing and shredding elements, and the pin 66 is spaced considerably below the top of bowl sleeve 51.

The improved slicing and shredding elements include a cutter plate 68 and the combined cover and safety feeder indicated generally at 69. The cutter plate 68 is provided with a central hub 70 having a handle portion 71 and a sleeve portion 72. The sleeve portion 72 is adapted to telescope over the upper end 37a of the drive shaft 37, and has diametrically disposed notches 73, which engage the projecting ends of the drive pin 66.

The handle portion 71 of the hub 70 is preferably internally threaded for receiving an axially movable adjusting screw 74, the lower end of which rests on the ball 47 when the slicing plate is positioned on the end 37a of the shaft 37. Thus, the screw 74 provides means for adjusting the position of plate 68, relative to the other parts of the device.

As shown in Figs. 1, 3, 4 and 5, the slicing plate 68 is provided with a blade 75, which may be struck up from the plate or otherwise formed thereon, it being understood that a plurality of different slicing plates may be supplied with the improved slicing and shredding device, each having different blade openings 76 for slicing different thicknesses of materials.

The combined cover and safety feeder 69 is utilized when operating either slicing or shredding plates, and includes a cover plate 78 preferably provided with a downturned peripheral flange 79 for telescoping over the upper end portion 80 of the food receiving bowl 48; and the flange 79 is preferably provided with diametrically disposed bayonet locking slots 81 (Fig. 6) for locking engagement with lugs 82 provided on the upper end 80 of the bowl 48, whereby the cover plate and safety feeder attachment may be secured and locked to the food receiving bowl.

The cover plate 78 also is preferably provided with an opening 83, one portion of which may terminate in a downturned stop bar 84 and another portion of which may terminate in a safety cam 85, for purposes which will hereinafter be described. A hopper 86 is secured to the plate 78 as by riveting at 87, extending upwardly from the opening 83, and a pusher and feeder generally indicated at 88 may be inserted into the hopper 86 for pressing a vegetable 89 or the like against the cutter plate 68, so that rotation of the plate 68 cuts slices 89a from the vegetable 89.

The feeder 88 preferably comprises an inner member 90 and an outer member; and the outer member preferably includes a feeder tube 91, an upper plate 92 secured at 93 to the upper end of the tube 91, and a lower plate 94 secured at 95 to the lower end of the tube 91. The inner feeder member 90 is preferably a wooden pusher or bat having a handle portion 96, a tubular portion 97 with a flange 98 therebetween, and upon inserting the tubular portion 97 within the outer feeder tube 91, the inner and outer feeder members may be locked together by a finger actuated lock 99 pivotally mounted at 99' on the plate 92 and having a lock 99a for engaging over the flange 98 of the inner feeder member 90.

In Fig. 7 of the drawings is shown a slightly modified slicing plate 168 operatively mounted in the improved food receiving bowl 48. The slicing plate 168 is substantially identical with slicing plate 68, except that it has an upturned peripheral flange 168a instead of the downturned peripheral flange 68a of slicing plate 68. In using slicing plates having upturned peripheral flanges, a slightly modified cover plate 178 is required having the annular groove 178a for receiving the upturned flange 168a.

One or more shredding plates such as indicated at 101 in Fig. 8, may be provided for shredding foods, and the shredding plates are like the slicing plates except that they are provided with series of raised cutting portions such as indicated at 102. Obviously, the slicing and shredding plates may be provided with either downturned or upturned peripheral flanges without departing from the scope of the invention as defined in the claims.

In operating the improved slicing and shredding device with the safety feeding attachments, the food receiving bowl 48 is positioned as shown in Fig. 1 with its sleeve 51 telescoped over the base housing sleeve 27, and the bowl is locked against rotation by moving the lever 62 to the position shown in Fig. 1. The desired slicing or shredding plate 68 or 101 is then mounted on the upper end 37a of the drive shaft 37. The cover plate 78 is locked to the bowl, as best shown in Figs. 4 and 6, and is thereby held stationary.

Various foods, such as cabbage, potatoes and the like, may then be introduced into the hopper 86, and the feeder 88 pressed against the same so that a slicing or shredding occurs upon rotation of the shaft 37 by the driving motor. If smaller vegetables are to be sliced or shredded, such as carrots, cucumbers and the like, the outer feeder will be positioned within the hopper, the lock 99 released, and the vegetable introduced to the rotating slicing or shredding plate through the feeder tube 91 by pressing the same downward with the inner feeder 90.

The bar 84 serves as a cutter bar against which the material to be sliced or shredded is pressed during a cutting operation, and the adjusting screw 74 is provided for each cutter or shredder plate so that the location of the cutting blade or blades thereof may be brought closely adjacent to the lower edge of the cutter bar 84, it being pointed out that the entire load imposed by the cutter plate and a cutting operation is carried directly by the upper end 37a of the shaft 37, which drives the cutter plate.

The improved safety cam 85 depends slightly below the cutter bar 84 so that if the cutter plate is adjusted at too high a position, or if the plate is not properly positioned, the knife blade will first ride along the cam 85 and will miss the cutter bar 84, but will cause the cover 78 and the bowl 48 to which it is locked to be raised.

The improved slicing and shredding device is rigid, compact and simplified in construction, and overcomes the difficulties encountered with prior devices of this type; and the various slicing and shredding attachments may be quickly attached to or detached from the drive shaft above the bowl without the use of bolts, screws, or other special fastening and mounting means; and if desired other food processing elements may be operatively attached in the same manner.

Due to the fact that the driving mechanism is housed in the base, all oil and grease necessary for lubricating the driving mechanism is at all times kept below the food receiving bowl, so as to render it impossible for oil or grease to drop into or become mixed with food therein; and the center of gravity of the device is located either within or below the bowl, so that the device is not top heavy and will not tip over during use.

The operator cannot become injured in operating the various slicing and shredding attachments because of the improved safety devices which are incorporated in the present slicing and shredding device.

The slicing and shredding elements may be readily removed or detached for being washed and kept in a sanitary condition, and subsequently replaced without the use of bolts, screws or special fastening means; and since the bowl sleeve projects above the driving pin and is telescoped over the driven sleeve of each cutting plate, there are no cavities or pockets and the like where food may collect to render the device unsanitary or affect the operation of the driving or driven parts or mechanism thereof.

I claim:

1. A food slicing and shredding device having a base, a housing sleeve projecting upward from said base, a drive shaft projecting upward from said base through said housing sleeve, a cutting plate having a sleeve telescoped over the upper end of the drive shaft within said base housing sleeve and operatively connected to said drive shaft, a bowl surrounding said cutting plate and having a central tubular sleeve telescoped over said base housing sleeve and cutting plate sleeve, a cover plate on the bowl having a depending cutter bar for cooperating with said cutting plate, and means on said cutting plate and abutting said drive shaft for adjusting the position of the cutting plate relative to the cutter bar.

2. In a food preparing device having a driving shaft projecting vertically upwards from a base and having a bowl telescoped over said driving shaft, a plate provided with a cutting element removably mounted for rotation within said bowl on the upper end of said shaft, a cover plate mounted on said bowl in spaced relation to said cutting plate and provided with an opening in alignment with the cutting element thereof, a food hopper extending upward from said opening, a cutter bar on said cover plate extending downward from one portion of said opening, and means carried by said cutting plate axially engaging the upper end of said shaft for adjustably supporting said plate on said shaft to adjust the position of the cutting element thereof relative to the cutter bar.

3. In a food preparing device having a driving shaft projecting vertically upwards from a base and having a bowl telescoped over said driving shaft, a plate provided with a cutting element removably mounted for rotation within said bowl on the upper end of said shaft, a cover plate mounted on said bowl in spaced relation to said cutting plate and provided with an opening in alignment with the cutting element thereof, a food hopper extending upward from said opening, means carried by said cutting plate axially engaging said shaft for adjustably supporting the cutting plate thereon relative to the cover plate, a cutter bar extending downward from the cover plate at one portion of said opening, and a curved safety cam extending downward from the cover plate at another portion of said opening and depending slightly below said cutter bar, whereby when the cutting element is located too close to the cutter bar the safety cam will engage said cutting element to raise the cover plate and its cutter bar above said cutting element.

EUGENE F. MARTINET.